United States Patent [19]

Gómez-Sánchez et al.

[11] Patent Number: 4,572,732
[45] Date of Patent: Feb. 25, 1986

[54] MACHINE FOR CUTTING OFF EXCESS ENDS OF HOLLOW GLASS, PLASTIC OR SIMILAR ARTICLES

[75] Inventors: Abel Gómez-Sánchez, Monterrey; Jaime Valdes-Neri, Guadalupe; Miguel H. C. Quintero, San Nicolas de Los Garza, all of Mexico

[73] Assignee: Vitrocrisa Cristaleria, S.A., Nuevo Leon, Mexico

[21] Appl. No.: 634,300

[22] Filed: Jul. 25, 1984

[30] Foreign Application Priority Data

Jul. 28, 1983 [MX] Mexico .................................. 198198

[51] Int. Cl.[4] ............................................. C03B 21/02
[52] U.S. Cl. ........................................ 65/271; 65/113; 65/269; 65/270
[58] Field of Search ................. 65/105, 113, 272, 269, 65/271, 270

[56] References Cited

U.S. PATENT DOCUMENTS 2,050,088  8/1936  Dichter ................................. 65/271
3,113,012  12/1963  Smith ................................. 65/272 X Primary Examiner—Arthur Kellogg
Attorney, Agent, or Firm—Abelman, Frayne, Rezac & Schwab

[57] ABSTRACT

A machine for trimming hollow glass articles includes a support in which a semi-finished article is held stationary and immovable, and a pair of split oscillatory burners for flame cutting at least one excess end of the semi-finished article, the burners being oscillatable relative to the stationary article in order to effect the required flame cutting operation.

6 Claims, 5 Drawing Figures

MACHINE FOR CUTTING OFF EXCESS ENDS OF HOLLOW GLASS, PLASTIC OR SIMILAR ARTICLES

BACKGROUND OF THE INVENTION

In the manufacture of hollow glass articles, such as drinking glasses, tubes enlarged at their mid portion, for the so-called "oil lamps", etc., once said articles have been formed in the corresponding machines, it becomes necessary to cut the excess of glass of the articles by using cutting apparatuses which are common in the glass industry, same which cut off the excess glass of articles and simultaneously flange the cut portions of these. Once said articles are cut on one or both ends, they are transported to a tempering furnace, where they are relieved of the stress or efforts accumulated along the process of their manufacture.

The cutting systems known at present are composed of a gyratory fastening base, which holds the glass article from its intermediate convex portion or from its closed end; a burner of the gas-oxygen type which heats up glass along an imaginary cutting line, until it makes it reach a melting temperature whereby the excess portion of glass of the article is separated. As soon as the cutting has been done, the burner is left actuated shortly over the cut portion of article so as to flange the same and to provide a finish thereto.

An example of the cutting apparatuses may be found in U.S. Pat. No. 2,334,111 of Nov. 9, 1943, which describes a machine for cutting the spare portions of glass articles. In this case, the article meant to be cut is placed in an inverted position over a vertically reciprocating disk, and subsequently held from its upper end by a vacuum chuck. As the cutting operation is initiated, the chuck and disk gyrate but in one direction, thereby exposing the article to the heat of the burner and, as glass starts to melt, the chuck elevates the article and the excess portion of the article in the disk is then submitted to a force opposite to the initial rotation of the article, thus producing a tensile action which continues with the cutting of the article. At the same time, the top portion of the article keeps elevating until the article is cut according to a specified line.

Another example of the cutting apparatuses is described in the U.S. Pat. No. 2,537,660 of Jan. 9, 1951, which relates to an apparatus for the thermal cutting of the excess portions of hollow glass articles (drinking glasses, in particular), which by means of a chuck by the use of suction, holds the glasses in an inverted position, this is to say, from the bottom, while a article support with moil-gripping fingers holds the excess of glass. During the cutting operation and before glass melts by the action of the burner, the chuck and article support gyrate in the same direction and, afterwards, as glass begins to melt, the article support starts to move downwards gradually, in order to separate the glass in a uniform manner.

Nevertheless, even there are machines for cutting the excess of glass articles, the actual problem with these is that they have not been capable of achieving that the cutting of glass be made in a uniform way, for a "teardrop" always forms at the last point of separation of glass.

Another problem found is that, the principle of causing the article to gyrate, while having a static burner of the gas-oxygen type emit energy for melting the glass, offers the follow ing disadvantage: the mechanisms used for holding and causing the article to gyrate in the burner create certain eccentricity between the article and the burner, thereby causing it to follow a sine-wave trajectory when cutting the excess portion and thus affecting the edge of the article.

A further problem is that, in the machines used nowadays, there is too much separation between the burner and the article, and this causes the thickness of the frame -once the cut has been done- to make the flange of the article thick too, thus leaving much to be desired as to the quality of same.

All of these disadvantages and inconveniences of the previous techniques are totally set aside with a machine which cuts the excess portion(s) of glass articles while keeping these firmly fastened, and featuring a burner with an oscillatory movement on the ends of same. This allows to maintain a constant distance between the burner and the article, thereby making sure that the article receives the same amount of energy all around the perimeter of such article.

Another advantage of this system is that the line of the flame maintains a straight trajectory, while being also possible to set the flame at a shorter distance and reduce the energy applied, thereby producing a thinner cut and one of more quality.

With this type of machine, the formulation of the "teardrop" at the point of separation of article is completely eliminated.

SUMMARY OF THE INVENTION

Therefore, it is one object of this invention to provide a machine for cutting off excess ends of hollow glass, plastic or similar articles, the cutting system of which is based on the principle of having oscillatory burners and a static article.

Another object of this invention is to provide a machine for cutting off excess ends of hollow glass, plastic or similar articles, in which it is made sure that the article receives the same calorific energy all around the perimeter thereof, thereby obtaining articles of better quality.

A third object of this invention is to provide a machine for cutting off excess ends of hollow glass, plastic or similar articles, that avoids the formulation of "teardrops" at the last point of separation of glass.

A further object of this invention is to provide a machine for cutting off excess ends of hollow glass, plastic or similar articles, that allows the cutting of articles of complex form.

One more object of this invention is to provide a machine for cutting off excess ends of hollow glass, plastic or similar articles, that allows the simultaneous cutting in several sections of the article.

Another object of this invention is to provide a machine for cutting off excess ends of hollow glass, plastic or similar articles, that allows to secure a thinner edge in the finishing process of articles.

These and other additional objects and advantages of this invention shall be evident to the experts in the field, from the following detailed description of the invention.

BRIEF DESCRIPTION OF THE DRAWINGS

The invention shall be described forthwith, by referring to some specific modalities of same, depicted in the drawings which are attached to illustrate them, where the numbers relate to the parts shown in the figures, where.

DETAILED DESCRIPTION OF THE INVENTION

Figure 1:
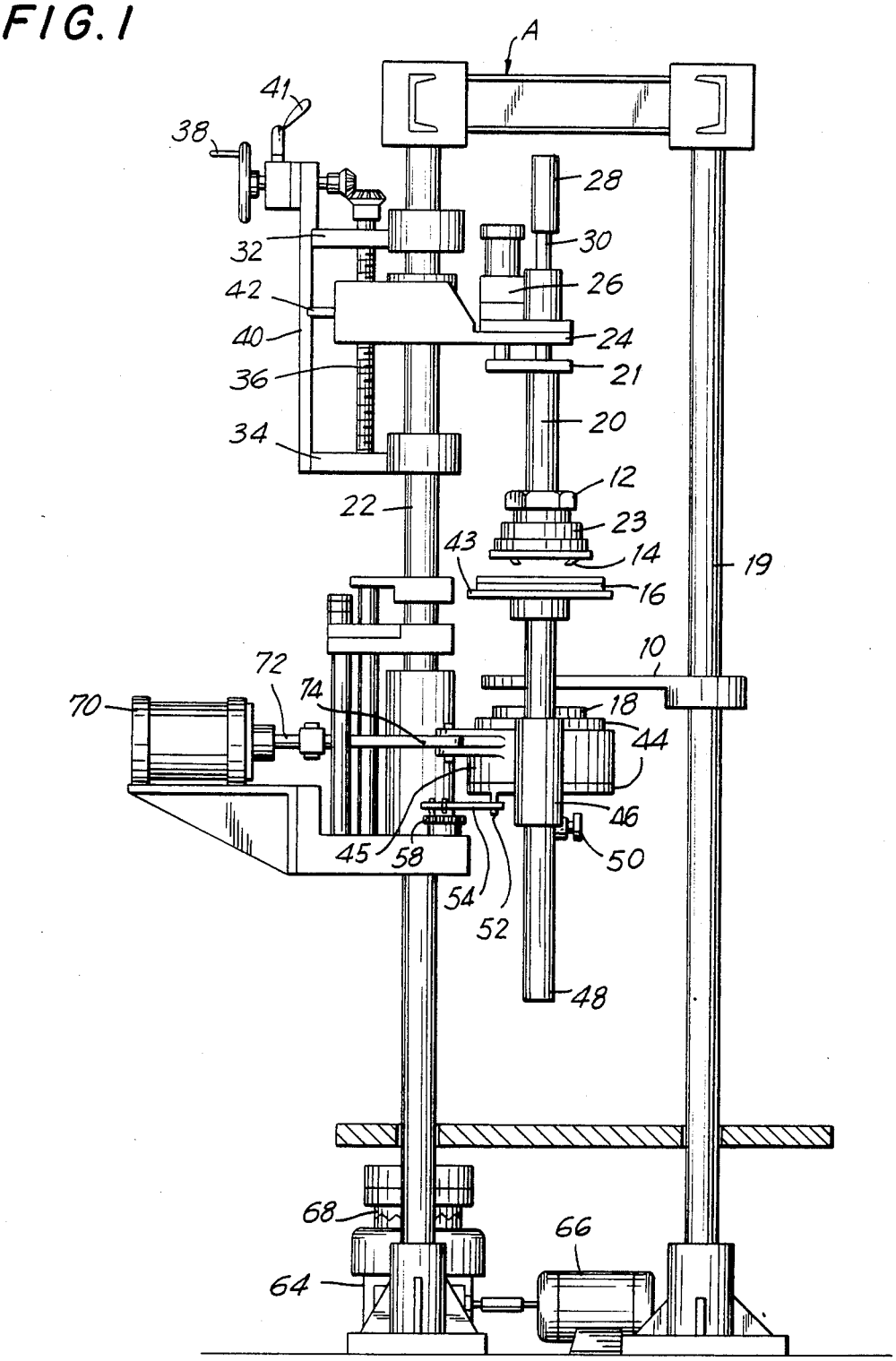
FIG. 1 is an elevation of a first modality of the apparatus of this invention.

The invention will be described, at first, by making reference to the modality illustrated in FIG. 1. In this case, the machine for cutting the excess portions of glass, plastic or similar articles, includes, essentially, a support base 10, for holding a semi-finished glass article (not shown) from the middle part thereof; an spindle 12, having mechanical fingers 14, for holding the article from its upper part and detaching the excess portion of the article in a controlled and gradual manner; and two oscillating split burners, one on top 16 and the other at the bottom 18, for cutting the excess portions of the article and simultaneously flange the cut ends, thus providing the finish to it.

Each of the aforementioned components is mounted on a structure A, encompassing a supporter 19 upon which the support base 10 and a supporter 22—at the opposite end—are positioned, for holding spindle 12 and the oscillating burners 16 and 18. Each of the novel components featured by this machine will be individually described for a better understanding of the invention.

As for the excess portion spindle 12, this embraces, a tubular supporter 20 containing a stopping element 21 on one end, and a bell-shaped seat (socket) 23 at the back end thereof. Said supporter 20 through the stopping element 21, is linked to a supporting arm 24 which, through a hydraulic cylinder 26 is coupled to such stop 21, so as to provide an upward and/or downward movement to the mentioned tubular supporter 20. A shaft 30, placed internally in supporter 20, slides vertically to open or close fingers 14 by moving downwards or upwards. A pneumatic cylinder 28, positioned in the upper part of the supporting arm 24, joins shaft 30, so to order fingers 14 to exert a releasing or retaining movement as for the excess portion of the article.

Said supporting arm 24, through an elevating mechanism, slides vertically on supporter 22 so as to graduate the height of the spindle 12, in accordance with the size of the article. A pair of supporting clamps 32, 34 coupled to supporter 22 hold a screw 36 from each of its ends. Such screw 36 is coupled to the supporter 24, which, as is gyrated by wheel 38, does not move axially, but draws such supporter 24 vertically, for elevating or lowering the position of spindle 12.

A guiding plate 40, placed between clamps 32, 34, together with a follower 41 coupled to a supporter 24, maintain the correct position of spindle 12 with respect to the glass article. A lock system 42, coupled to the wheel 38, keeps the position of supporter 24 fixed, as soon as the position of spindle 12 has been set.

As for the burners 16 and 18, as it has been previously set forth, these are of the split type, and they oscillate around the fixed article for cutting the excess portion of the article and simultaneously flange the cut ends of same.

Each burner 16 and 18, is coupled respectively to clamps 43, 45, which open or close simultaneously, together with each burner 16, 18. The oscillating movement of burners 16, 18 starts when clamps 43, 45 close, around the ends of the glass article.

Figure 5:
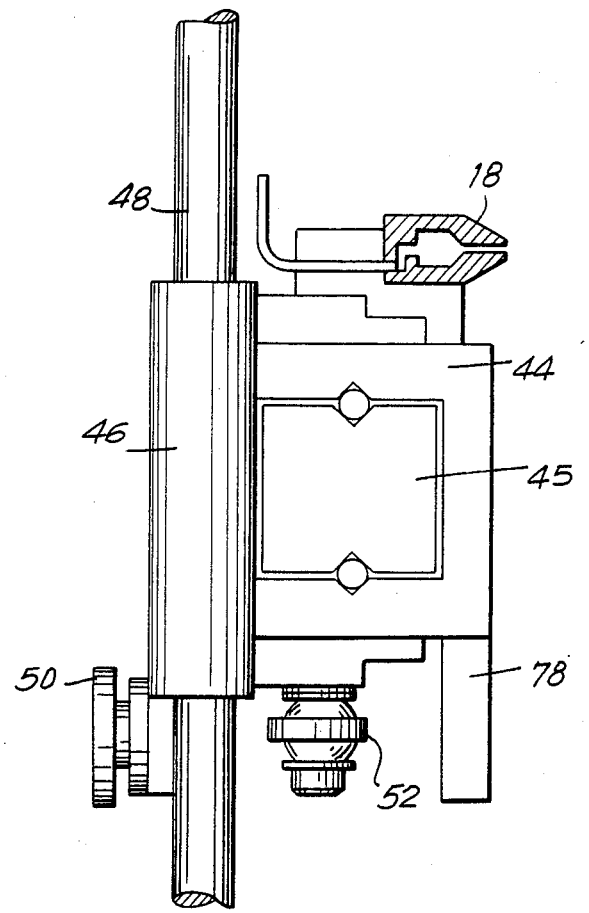
FIG. 5 is a sectional view showing the parts of the burner support.
Figure 3:
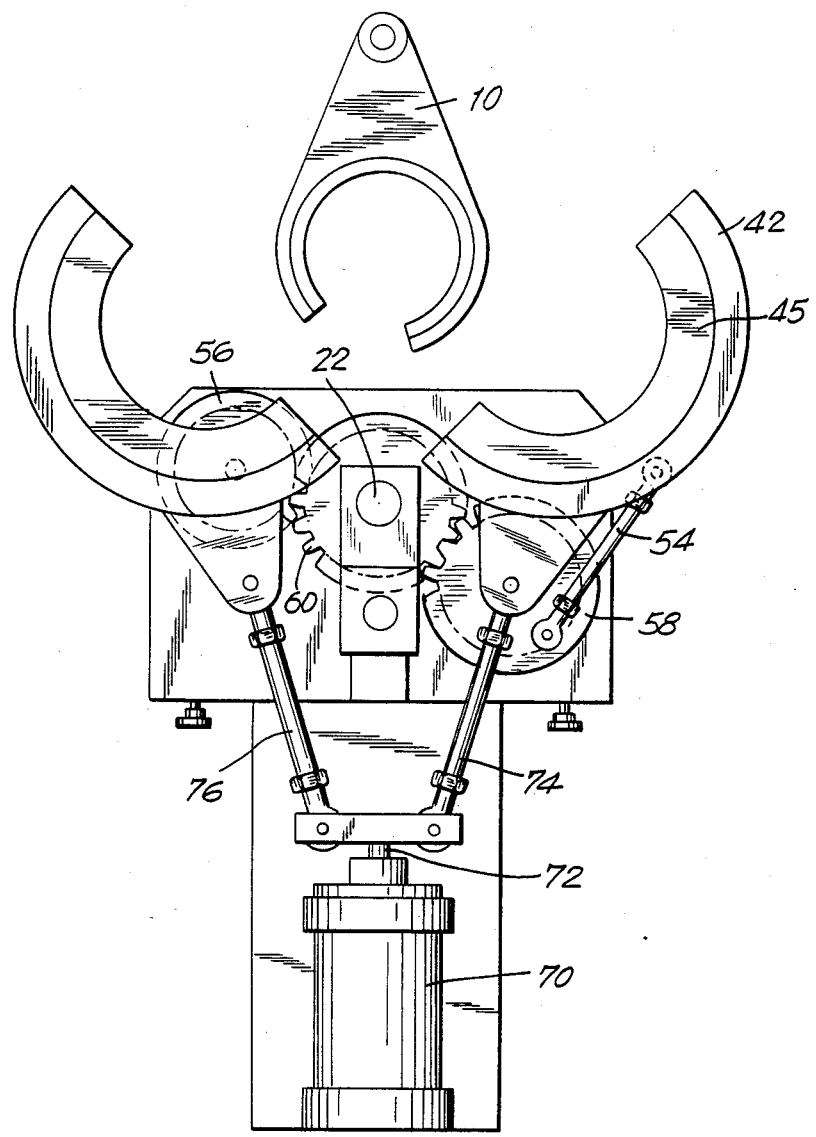
FIG. 3 in an in-plan top view, showing the split burner in its open position.

In the modality illustrated in FIG. 1, the burner 18 includes a slide 44, which can be seen more clearly in FIG. 5, where a tubular supporter 46 (one on each side) is coupled, on both ends of the slide 44, so as to move together with said burner 18. Such supporter 46, has a coupled rack 48 (one on each side of supporter 46) which is coupled from its upper end to clamps 43 of top burner 16. This coupling allows to transmit the oscillating movement of the burner 18 to the burner 16. An adjusting knob 50, coupled between each of the supporters 46 and the racks 48, allows for the adjustment of the height of burner 16, in accordance with the size or form of the article to be cut. A link 52, coupled to the lower part of the slide 44, allows for the coupling of a con necting rod and crank mechanism 54, in order to cause burners 16, 18 to oscillate. This mechanism 54, receives movement by the -action of a gearing (FIG. 3), composed of a couple of gear 56, 58 (one per each of the halves of clamps 43, 45) and a central gearing 60 coupled to supporter 22 for imparting movement from one gear, the 56, to the other, the 58. Gear 56 receives movement through shaft 62, by means of a reducer 64 and the corresponding motor thereof 66. A clutch 68 between reducer 64 and shaft 62 interrupts the oscillatory movement of burners 16, 18, when clamps 43, 45 are in their open position.

Figure 4:
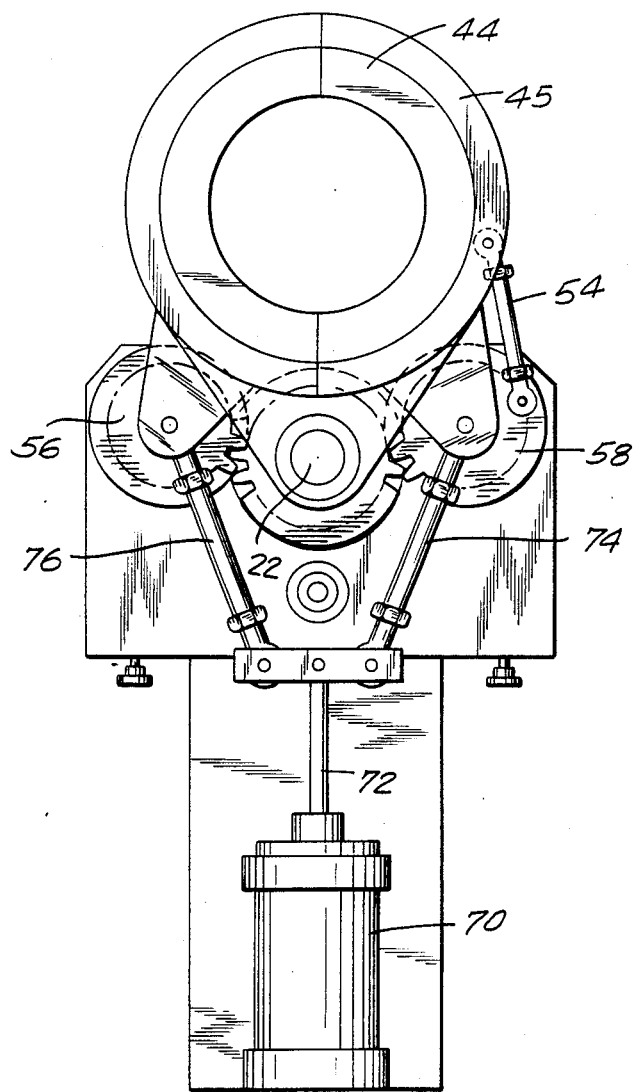
FIG. 4 is another in-plan top view, showing the burner in its closed position.

A burner actuating mechanism, for opening and closing clamps 43, 45, placed in the upper portion of burner 18 (FIGS. 1, 3 and 4), encompassing: a pneumatic cylinder 70 which through its stem 72, is connected pivotally to a pair of links 74,76. Each of the links 74, 76 are articulated to each of the halves of clamp 45 of burner 18, so as to simultaneously open or close said burners 16 and 18 through the reciprocating linear movement of cylinder 70.

As it might be understood, the process for the cutting of both excess ends of hollow glass articles consists, basically, of: fixing a semi-finished article (not shown) in the support base 10, in vertical position. Once said article has been places, the spindle 12 by means of its fingers 14 holds the article from its upper part; afterwards, clamps 43, 45 are closed, along with burners 16, 18, on each of the excess ends of the article. As soon as clamps 43, 45 are closed, burners 16, 18 start to oscillate simultaneously by means of the connecting rod-and-crank mechanism 54, thereby heating up glass until reaching a melting point; -subsequently, the spindle 12, through its hydraulic system 26, begins its upward trajectory, thereby pulling the top excess -portion of the article gradually, while the lower excess portion in the bottom of the article is detached by the action of gravity, thus carrying cut the cutting in the lower section. A guide 78, coupled to the lower portion of slide 44, allows for the detachment of the excess portion to take place in a uniform way, thereby avoiding the formation of "teardrops" at the last point of separation of glass; next, the cuts are flanged, by leaving the article exposed to burners 16, 18 for a certain period of time, so as to provide a better finish to it. The oscillatory movement of burners 16, 18 is later interrupted while clamps 43, 45 open, by the retraction movement in cylinder 70, and the article is withdrawn from support base 10, after which the fingers 14 of the spindle 12 open, thereby dropping the top excess portion of the article into a duct (not shown) through which said portion goes to the refuse receptacle.

Figure 2:
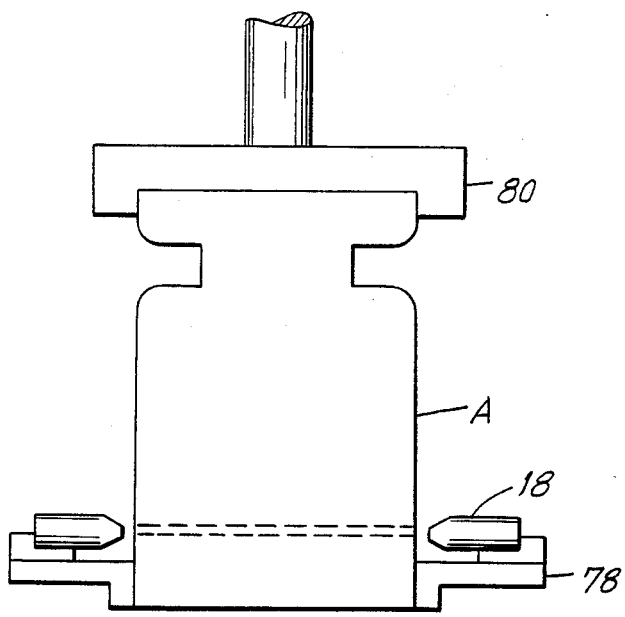
FIG. 2 is another elevation of a second modality of the apparatus of this invention.

The machine of this invention, as appears in the second modality (illustrated in FIG. 2), is meant for the cases where only one cut of the article is required. In this case, as shown in said FIG. 2, an article A is retained by a static fastener 80, which holds the article firmly (fixed), while, in the lower part, an oscillating burner, similar to that appearing in FIG. 1 (with reference number 18), cuts the article, after which the excess portion of the article is detached by the action of gravity. Guides 78 (FIG. 5) cause the excess portion of the article to be detached in a uniform manner, thereby obtaining a cut of better quality.

Notwithstanding that the foregoing description has been set forth with respect to some specific modalities of the invention hereof, it shall have to be understood by all experts in the field that other variations may be made to the invention; therefore, the invention hereof is not to be considered restricted, except to the extent required by the above technique and by the intendment of the claims hereafter cited.

What is claimed is:

1. A machine for trimming opposite excess ends of elongate tubular articles of glass, plastic or similar materials, and comprising:
   means for the stationary support of an elongage tubular semi-finished article at a position intermediate its ends, and with its longitudinal axis oriented substantially vertically;
   two pairs of split burners, one located for flame cutting an upper excess part of the article, and the other located for flame cutting a lower excess part of the article, said respective pairs of split burners being coupled to each other for them to open and close in unison about both said excess ends of said article;
   means for centering and holding said article, including means for raising said centering and holding means at a predetermined rate of movement after cutting action has been effected; and,
   means for simultaneously oscillating said respective burners along circular paths substantially concentric with said elongate tubular member at the time said burners are closed around the excess ends of said article.

2. The machine as defined in claim 1, wherein adjustment members for said burners include:
   at least one vertical support fixedly coupled to the lower burner to oscillate in unison with said lower burner;
   at least one rack bar having one end coupled to said upper burner and having the other end positioned in said vertical support, in order to transmit the oscillating movement of said lower burner to said upper burner; and,
   means coupled between said vertical support and said rack bar to allow the adjustment of the distance between said upper and lower burners.

3. The machine as defined in claim 2, wherein supports for said burners include:
   arcuate guides pivoted on said machine at one of their ends for opening and closing movement;
   slide members supported on said respective arcuate guides, said slide members supporting said respective upper and lower split burners; and,
   means to produce oscillation of said slide members and said burners along said circular paths.

4. The machine as defined in claim 3, wherein the burner supports include:
   a pair of members, each member having one end pivotally connected to a said arcuate guide and the other end articulated to linear drive means, in order to move said arcuate guides angularly relative to each other upon linear movement of said drive means in an appropriate direction.

5. The machine as defined in claim 1, wherein said means for centering and holding the article includes:
   support means in which said centering and holding means is vertically slidable;
   a support arm connected to one end of said centering and holding means;
   reversable drive means positioned on said support means and coupled to said support arm;
   a shaft extending internally of said centering and holding means and within which it slides vertically;
   retention means coupled to the lower end of said shaft, for holding an excess end of a said article; and,
   second drive means coupled to the upper end of said shaft to provide a releasing movement to said retention means.

6. The machine as defined in claim 5, including:
   adjustable means coupled to said support means, and operative to adjust the height of said retention means in dependence on the size of the article to be held.

* * * * *

UNITED STATES PATENT AND TRADEMARK OFFICE
CERTIFICATE OF CORRECTION

PATENT NO. : 4,572,732

DATED : February 25, 1986

INVENTOR(S) : GOMEZ-SANCHEZ, et al.

It is certified that error appears in the above-identified patent and that said Letters Patent is hereby corrected as shown below:

Title page, column 1

Correct the spelling of the third inventor to read

--Miguel H. CALDERON-QUINTERO--

Signed and Sealed this

Fifth Day of August 1986

[SEAL]

Attest:

DONALD J. QUIGG

Attesting Officer

Commissioner of Patents and Trademarks